United States Patent
Ohno et al.

(10) Patent No.: US 10,532,427 B2
(45) Date of Patent: Jan. 14, 2020

(54) OPTICAL PROCESSING HEAD, OPTICAL MACHINING APPARATUS, AND CONTROL METHOD AND CONTROL PROGRAM OF OPTICAL PROCESSING HEAD

(71) Applicant: TECHNOLOGY RESEARCH ASSOCIATION FOR FUTURE ADDITIVE MANUFACTURING, Tokyo (JP)

(72) Inventors: Hiroshi Ohno, Yokohama (JP); Tetsuo Sakai, Yokohama (JP); Mitsuo Sasaki, Yokohama (JP); Kazuyuki Masukawa, Yokohama (JP); Takashi Obara, Yokohama (JP); Yuji Sasaki, Yokohama (JP); Satoshi Tsuno, Yokohama (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 0 days.

(21) Appl. No.: 14/888,582

(22) PCT Filed: Feb. 20, 2015

(86) PCT No.: PCT/JP2015/054882
§ 371 (c)(1),
(2) Date: Nov. 2, 2015

(87) PCT Pub. No.: WO2016/132554
PCT Pub. Date: Aug. 25, 2016

(65) Prior Publication Data
US 2016/0368087 A1    Dec. 22, 2016

(51) Int. Cl.
*G02B 27/40*     (2006.01)
*B23K 26/06*     (2014.01)
(Continued)

(52) U.S. Cl.
CPC ...... *B23K 26/0648* (2013.01); *B23K 26/0665* (2013.01); *G02B 27/30* (2013.01); *G02B 27/40* (2013.01)

(58) Field of Classification Search
CPC .............. B23K 26/0648; B23K 26/342; B23K 26/0665; G02B 27/0927; G02B 27/0955;
(Continued)

(56) References Cited

U.S. PATENT DOCUMENTS

| 6,526,089 B1 | 2/2003 | Haeno et al. |
| 2005/0150876 A1* | 7/2005 | Menin ................ B23K 26/0884 219/121.63 |

(Continued)

FOREIGN PATENT DOCUMENTS

| EP | 1568436 A1 * | 8/2005 | ......... B23K 26/0884 |
| EP | 1 684 109 A1 | 7/2006 | |

(Continued)

OTHER PUBLICATIONS http://www.rpgroup.caltech.edu/courses/aph162/2007/Protocols/Optics/e3613_Focusing-and-Collimating.pdf.*
(Continued)

*Primary Examiner* — Dana Ross
*Assistant Examiner* — Joseph M Baillargeon
(74) *Attorney, Agent, or Firm* — Ladas & Parry LLP (57) ABSTRACT

An optical processing head capable of reducing the energy loss at the time of optical processing is disclosed. The optical processing head includes a first optical element that converts light emitted by a light source into first parallel light, a second optical element that is arranged downstream of the first optical element and converts the first parallel light into first divergent light, a third optical element that is arranged downstream of the second optical element and converts the first divergent light into second parallel light, and a fourth
(Continued)

optical element that is arranged downstream of the third optical element and converts the second parallel light into convergent light which is condensed on the processing surface side.

13 Claims, 9 Drawing Sheets

(51) Int. Cl.
*B23K 26/342* (2014.01)
*G02B 27/09* (2006.01)
*G02B 27/30* (2006.01)

(58) Field of Classification Search
CPC .......... G02B 27/30; G02B 27/40; G02B 9/34; G02B 9/00; G02B 13/004; G02B 13/00; G02B 9/60; G02B 9/62; G02B 9/64
USPC .................. 219/121.75, 121.61, 121.67–69, 219/121.62–63, 121.76–77, 121.82–83, 219/121.85; 359/686, 747, 797, 643, 644, 359/656–660, 754–775
See application file for complete search history.

(56) References Cited

U.S. PATENT DOCUMENTS

| | | |
|---|---|---|
| 2006/0228095 A1* | 10/2006 | Eda ................... B23K 26/0057 385/147 |
| 2006/0245084 A1 | 11/2006 | Brustle et al. |
| 2008/0029497 A1 | 2/2008 | Eda et al. |
| 2008/0266862 A1* | 10/2008 | Shyshkin ........... G02B 27/0927 362/268 |
| 2012/0111310 A1 | 5/2012 | Ryu et al. |
| 2012/0182376 A1* | 7/2012 | Saito ................... B23K 26/032 347/248 |

FOREIGN PATENT DOCUMENTS

| | | |
|---|---|---|
| JP | 4-13492 A | 1/1992 |
| JP | 2001-100145 A | 4/2001 |
| JP | 2003-88984 A | 3/2003 |
| JP | 2005-177862 A | 7/2005 |
| JP | 2011-600 A | 1/2011 |
| WO | 2005/106564 A1 | 11/2005 |

OTHER PUBLICATIONS http://web.archive.org/web/20121025163824/http://assets.newport.com/webDocuments-EN/images/How_to_Build_a_Beam_Expander_5.pdf.*
International Search Report (ISR) dated May 13, 2015 for International Application No. PCT/JP2015/054882.
J-PlatPat English abstract of JP 2003-88984 A.
J-PlatPat English abstract of JP 2011-600 A.
J-PlatPat English abstract of JP 4-13492 A.
J-PlatPat English abstract of JP 2001-100145 A.
Extended European Search Report (ESR) dated Dec. 16, 2016 for corresponding EP Application No. 15 78 5040.5.
Japanese Office Action (JOA) dated Jan. 17, 2107 for corresponding Japanese Application No. 2016-510538.
J-PlatPat English abstract of JP 2005-177862 A.
European Office Action dated Jan. 22, 2018 in connection with European Patent Application No. EP 15 785 040.5.
Cvi Melles Griot : "Aberration Balancing" In: "The Practical Application of Light, vol. X (Catalog)", Jan. 1, 2006 (Jan. 1, 2006), Barloworld Scientific, Staffondshire, U.K., XP055437317, pp. 1.27-1.28.

* cited by examiner

FIG. 9

# OPTICAL PROCESSING HEAD, OPTICAL MACHINING APPARATUS, AND CONTROL METHOD AND CONTROL PROGRAM OF OPTICAL PROCESSING HEAD

RELATED APPLICATION

This application is an application under 35 U.S.C. 371 of International Application No. PCT/JP2015/054882 filed on Feb. 20, 2015, the entire contents of which are incorporated herein by reference.

TECHNICAL FIELD

The present invention relates to an optical processing head, an optical machining apparatus, and a control method and control program of the optical processing head.

BACKGROUND ART

In the above technical field, patent literature 1 discloses an apparatus that temporarily condenses and diverges a beam inside the apparatus, and then condenses it again at a processing position.

CITATION LIST

Patent Literature

Patent literature 1: US 2006/0245084

SUMMARY OF THE INVENTION

Technical Problem

In the technique described in this literature, the apparatus internally has a condensing point. If dust exists inside the apparatus, many beams are absorbed at the condensing point, increasing the energy loss.

The present invention enables to provide a technique of solving the above-described problem.

Solution to Problem

One aspect of the present invention provides an optical processing head comprising:

a first optical element that converts light emitted by a light source into first parallel light;

a second optical element that is arranged downstream of the first optical element and converts the first parallel light into first divergent light;

a third optical element that is arranged downstream of the second optical element and converts the first divergent light into second parallel light; and a fourth optical element that is arranged downstream of the third optical element and converts the second parallel light into convergent light which is condensed toward a processing surface.

Another aspect of the present invention provides an optical machining apparatus comprising: the optical processing head; a light source; and a light transmitting portion that transmits light emitted by the light source to the optical processing head.

Still other aspect of the present invention provides a control method of controlling an optical processing head, comprising:

an input step of inputting a defocus value of the light on the processing surface; and a movement step of moving at least one of the second optical element and the third optical element along an optical axis in accordance with the defocus value.

Still other aspect of the present invention provides an optical processing head control program causing a computer to execute:

an input step of inputting a defocus value of the light on the processing surface; and a movement step of moving at least one of the second optical element and the third optical element along an optical axis in accordance with the defocus value.

Advantageous Effects of Invention

According to the present invention, the energy loss at the time of optical processing can be reduced.

DESCRIPTION OF THE EMBODIMENTS

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
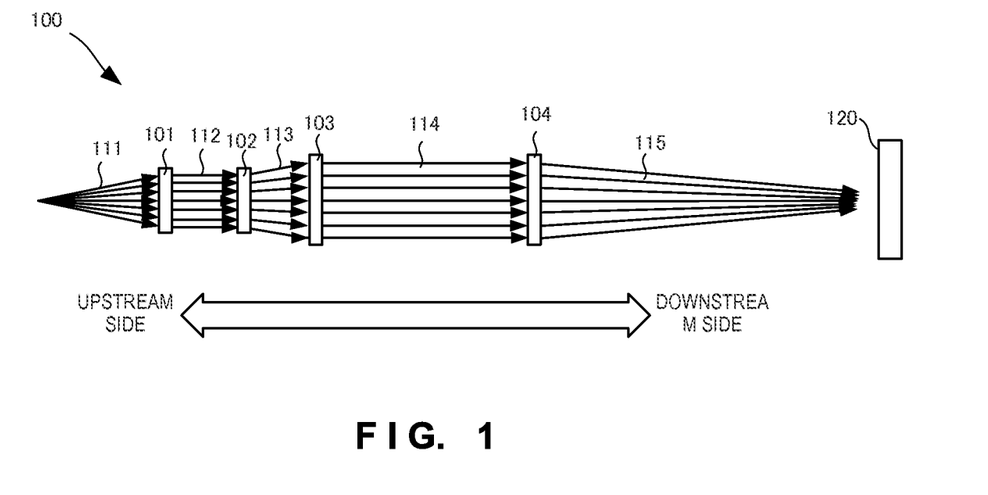
FIG. 1 is a view showing the arrangement of the optical system of an optical processing head according to the first embodiment of the present invention.

An optical processing head 100 according to the first embodiment of the present invention will be described with reference to FIG. 1. FIG. 1 is a view in which the optical system of the optical processing head 100 is extracted. As shown in FIG. 1, the optical processing head 100 includes optical elements 101 to 104.

The optical element 101 (first optical element) converts light 111 emitted by a light source into parallel light 112 (first parallel light). The optical element 102 (second optical element) is arranged downstream of the optical element 101, and converts the parallel light 112 into divergent light 113 (first divergent light). The optical element 103 (third optical element) is arranged downstream of the optical element 102, and converts the divergent light 113 into parallel light 114 (second parallel light). The optical element 104 (fourth optical element) is arranged downstream of the optical element 103, and converts the parallel light 114 into convergent light 115 that is condensed toward a processing surface 120.

Examples of optical processing using such an optical system are overlay welding and three-dimensional shaping, but the optical processing is not limited to them. The relative arrangement of the optical elements 101 to 104 is not limited to the arrangement in FIG. 1, and an arrangement complying with the types of optical elements (combination of lenses, mirrors, and the like) can be adopted. The optical elements 101 to 104 may be lenses, diffraction elements, or mirrors, but are not limited to them. In particular, the lens may be a planoconvex lens, a biconvex lens, an aspherical lens, or another lens.

With this arrangement, light emitted by the light source can be condensed on the processing surface without forming a condensing point inside the optical processing head. Thus, the energy loss of optical processing can be reduced.

Second Embodiment

Figure 2:
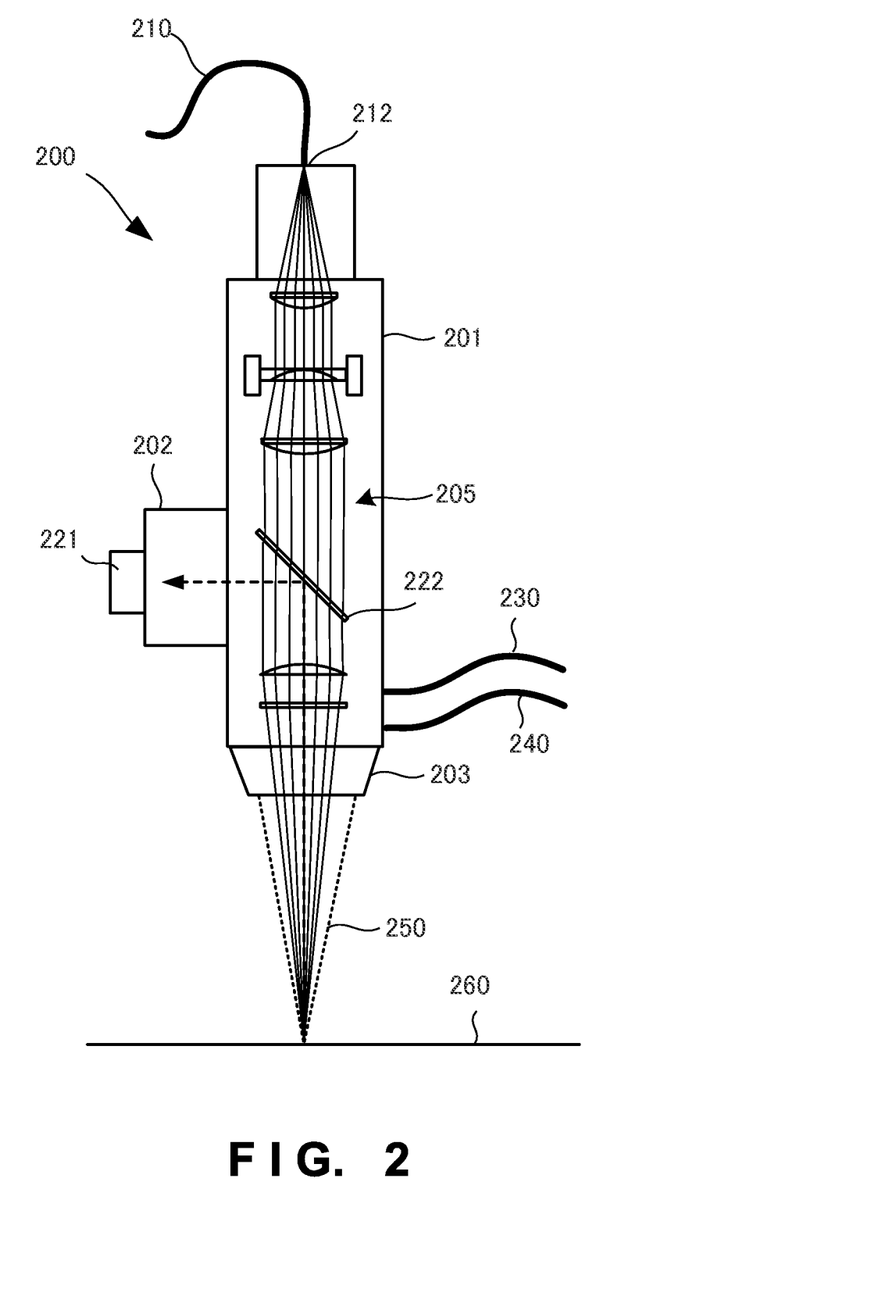
FIG. 2 is a view showing the overall arrangement of an optical processing head according to the second embodiment of the present invention.

An optical processing head 200 according to the second embodiment of the present invention will be described with reference to FIG. 2. FIG. 2 is a view showing the internal arrangement of the optical processing head 200. As shown in FIG. 2, the optical processing head 200 includes a condensing optical system apparatus 201, an observation apparatus 202, and a nozzle 203.

A beam 205 that has been emitted by a light source (not shown) and guided from an incident end 212 to the optical processing head 200 through a light transmission portion 210 passes through the inside of the optical processing head 200 and comes out to a processing surface 260.

The condensing optical system apparatus 201 receives supply of a processing material and gas from a material supply device and gas supply device (neither is shown) through a material supply portion 230 and a gas supply portion 240, and ejects a material 250 mixed in a processing gas to the processing surface 260 from the nozzle 203.

The observation apparatus 202 is a device for observing the status of processing by the condensing optical system apparatus 201 from a viewpoint along the optical axis, and includes an image capturing device 221 including an image sensor such as a CCD or CMOS sensor. Light traveling from the processing surface 260 is guided to the image capturing device 221 by a half mirror 222 arranged inside the condensing optical system apparatus 201. By performing feedback control of processing parameters in accordance with the observed processing status, the processing accuracy can be improved.

<<Lens Arrangement>>

Figure 3:
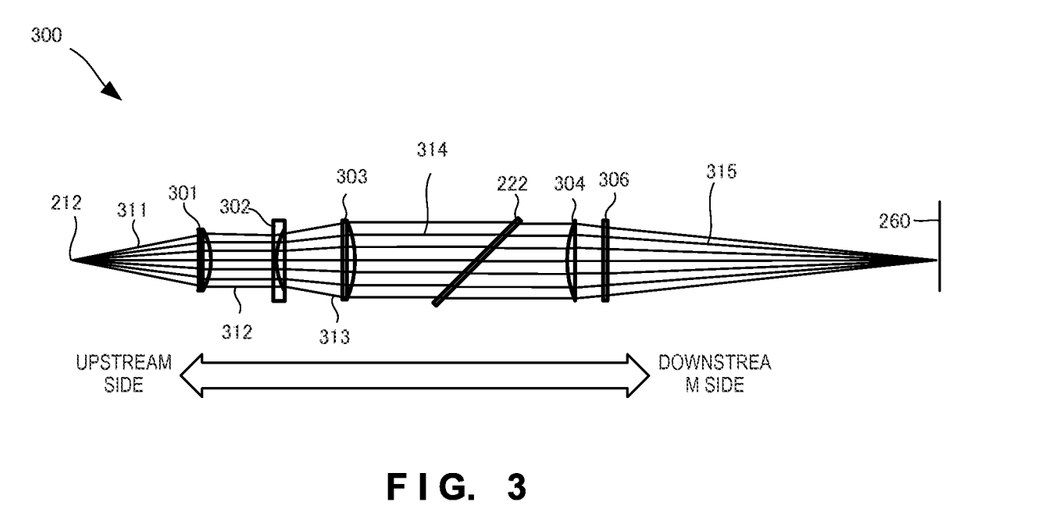
FIG. 3 is a view showing the arrangement of the optical system of the optical processing head according to the second embodiment of the present invention.

FIG. 3 is a view showing the lens arrangement of an optical system 300 inside the optical processing head 200. The optical system 300 of the optical processing head 200 includes lenses 301 to 304 as optical elements. The lens is smaller in absorption loss than other kinds of optical elements and higher in energy efficiency. By coating the lens with an antireflection film, the reflection loss of light can be reduced to several % or less, and the energy efficiency can be further improved. Since the absorption loss is small, the temperature hardly rises, and the thermal lens effect by the temperature rise (deformation of the lens shape by heat and degradation of the lens characteristic by a change of the refractive index) and degradation of the whole optical processing head 200 can be prevented.

Of the four lenses of the optical system 300, the planoconvex lens 301 is a spherical lens having a convex surface on the downstream side, and converts emitted light 311 incoming from the incident end 212 into parallel light 312.

The planoconcave lens 302 is a spherical lens having a concave surface on the downstream side, is arranged downstream of the planoconvex lens 301, and converts the parallel light 312 into divergent light 313. The planoconcave lens 302 operates to cancel aberration generated by the three remaining lenses. That is, the aberration of the whole optical system 300 can be reduced.

The planoconvex lens 303 is a spherical lens having a convex surface on the downstream side, is arranged downstream of the planoconcave lens 302, and converts the divergent light 313 into parallel light 314 larger in diameter than the parallel light 312. Hence, the density of beams can be decreased, and the temperature rise of the convex lenses 303 and 304 caused by absorption of the parallel light 314 can be reduced. The planoconvex lens 304 is a spherical lens having a convex surface on the upstream side, is arranged downstream of the planoconvex lens 303, and converts the parallel light 314 into convergent light 315 that is condensed toward the processing surface 260. That is, the angle formed by the beam direction of the beam 314 and the optical axis becomes equal to or smaller than the divergent angle of the divergent light 313 thanks to the presence of the planoconvex lens 303.

The above-described half mirror 222 is interposed between the planoconvex lens 303 and the planoconvex lens 304. The half mirror 222 is arranged with an inclination of, for example, 45° with respect to the optical axis. The half mirror 222 undergoes surface treatment so as to reflect, toward the image capturing device, light of a visible light component reflected by the processing surface 260 while transmitting light emitted by the light source. Hence, the processing surface can be observed without interrupting light emitted by the light source.

A planoconvex lens is a lens in which one of two facing surfaces is a flat surface and the other is a convex surface. A planoconcave lens is a lens in which one of two facing surfaces is a flat surface and the other is a concave surface. A spherical lens is a lens having a shape in which a convex surface or concave surface conforms to a single spherical surface.

Figure 4:
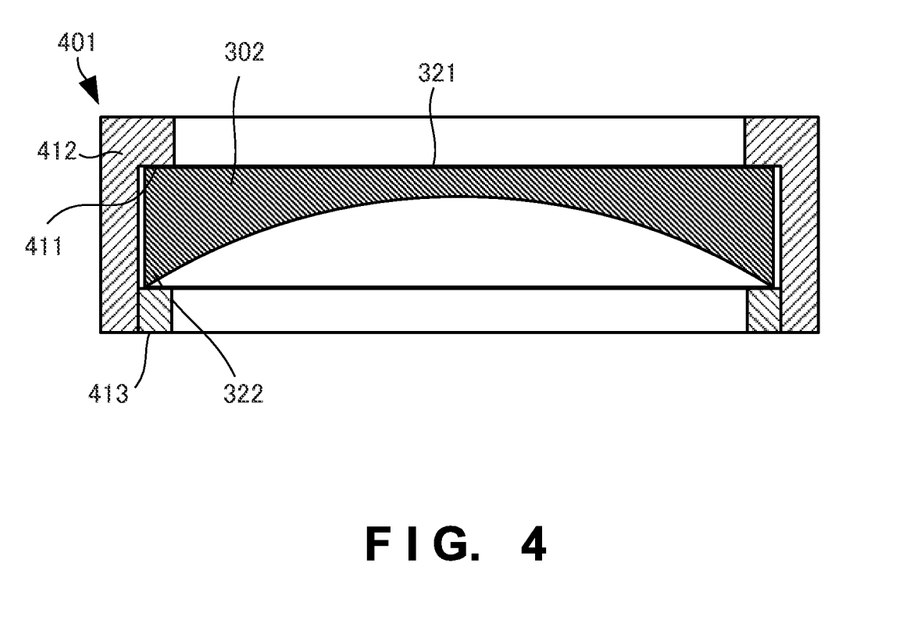
FIG. 4 is a view showing the arrangement of a concave lens used in the optical processing head according to the second embodiment of the present invention.

In general, when the lens surface is not a spherical surface but a flat surface, the processing accuracy of the surface roughness becomes high, the fabrication becomes easy, and the cost becomes low. As shown in FIG. 4, the planoconcave lens 302 is accommodated in a lens holder 401. The lens holder 401 is constituted by a female holder 412 and a male holder 413, and the female holder 412 and the male holder 413 are threaded and fixed by a screw. Although the planoconcave lens 302 is fixed by a pressure, an edge 322 of the planoconcave lens 302 on the concave surface side only slightly contacts the male holder 413. That is, the interface heat resistance at this contact portion is high. In contrast, a flat surface 321 of the planoconcave lens 302 contacts an inner flat surface 411 of the female holder 412, and the interface heat resistance is smaller than that on the concave surface side. Similarly, since the planoconvex lens has a flat surface, the interface heat resistance decreases, the performance of dissipating heat generated by absorption of light is enhanced, and an increase in absorption by the thermal lens effect (deformation of the lens shape by heat and degradation of the lens characteristic by a change of the refractive index) can be suppressed.

Since the flat surface 321 and the inner flat surface 411 of the lens holder 401 contact each other, a positional error when assembling the planoconcave lens 302 into the lens holder 401 is small. As a result, the alignment accuracy of the planoconcave lens 302 is increased, and aberration at a condensed spot is reduced.

<<Focal Length>> f1 is the focal length of the planoconvex lens 301, f2 is the focal length of the planoconcave lens 302, f3 is the focal length of the planoconvex lens 303, f4 is the focal length of the planoconvex lens 304, and m is the enlargement magnification of the whole optical system 300.

To perform high-definition processing, the condensed spot diameter needs to be decreased. To decrease the condensed spot diameter, aberration (fluctuation of a beam at a condensing point) needs to be minimized. The minimum value of the condensed spot diameter is called a best focus spot diameter. The best focus spot diameter is calculated by multiplying the diameter of the incident end 212 by the enlargement magnification m of the whole optical system 300. As aberration (fluctuation of a beam at a condensing point) is smaller at the time of focusing, the condensed spot becomes smaller and high-definition processing becomes possible.

When the half mirror 222 is arranged in the optical system 300, a beam is disturbed at the time of passing through the half mirror 222, and aberration increases. To minimize the disturbance of a beam, it suffices to make a beam passing through the half mirror 222 close to light as parallel as possible. The half mirror 222 is interposed between the planoconvex lens 303 and the planoconvex lens 304. The best focus spot diameter can be minimized by arranging the planoconcave lens 302 so that the beam 314 passing through the half mirror 222 at the time of best focusing becomes parallel light. More specifically, to implement this, the planoconcave lens 302 having a focal length equal to or smaller than that of the planoconvex lens 303 is selected, and the planoconcave lens 302 and the planoconvex lens 303 are arranged so that the upstream virtual image focus of the planoconcave lens 302 and the upstream focus of the planoconvex lens 303 coincide with each other. That is, the virtual image focus position (position spaced apart by f2 on the upstream side from the planoconcave lens 302) of the planoconcave lens 302, and a focus position (position spaced apart by f3 on the upstream side from the planoconvex lens 303) when parallel light enters the planoconvex lens 303 from the downstream side need to coincide with each other. Since a beam travels from the upstream side to the downstream side, the above-described focus position with respect to the planoconvex lens 303 is a virtual image focus position.

As is apparent from the above description, the focal length f2 of the planoconcave lens 302 and the focal length f3 of the planoconvex lens 303 need to satisfy the following condition:

$$f2/f3 \leq 1 \quad (1)$$

That is, by selecting the planoconcave lens 302 and the planoconvex lens 303 so as to satisfy f2≤f3, the virtual image condensing point position of the planoconcave lens 302 and the focus position of the planoconvex lens 303 can coincide with each other. Accordingly, the energy loss can be suppressed without actually arranging a condensing point inside the apparatus. This arrangement also has an effect capable of decreasing the entire length of the optical system because the virtual image condensing point is positioned upstream of the planoconcave lens 302, and no real condensing point need be formed.

As described above, to minimize the best focus spot diameter at the time of best focusing, aberration needs to be minimized. Aberration contains several components, and spherical aberration is a main component Therefore, a condition to minimize the longitudinal component (component of spherical aberration in the optical axis direction) of spherical aberration will be examined.

Letting f1# be the f-number of the planoconvex lens 301, f2# be the f-number of the planoconcave lens 302, f3# be the f-number of the planoconvex lens 303, and f4# be the f-number of the planoconvex lens 304, spherical aberration δ of the optical system 300 is given by:

[Mathematical 1]

$$\delta = \frac{0.272 f_1}{f_1^{\#2}} - \frac{1.069 f_2}{f_2^{\#2}} + \frac{0.272 f_3}{f_3^{\#2}} + \frac{0.272 f_4}{f_4^{\#2}} \quad (2)$$

Note that the second term of this equation takes a negative value. This is the characteristic of a concave lens, and the presence of this term can decrease the total value. If a convex lens is used instead of the concave lens, the second term becomes positive, and the overall aberration becomes large. That is, this embodiment can minimize aberration by using the concave lens as the second optical element.

The planoconcave lens 302 is a spherical lens having a concave surface on the downstream side, is arranged downstream of the planoconvex lens 301, and converts the parallel light 312 into the divergent light 313. Since the planoconcave lens 302 has the concave surface on the downstream side, the absolute value of the second term becomes maximum. That is, the effect of canceling another term becomes maximum. This produces an effect capable of minimizing aberration.

Let α be the incident NA (Numerical Aperture) from the incident end 212, β be the exit NA from the planoconvex lens 304, and m be the enlargement magnification. Then, when the Helmholtz-Lagrange conservation law is used for α and β, equation (3) is established:

[Mathematical 2]

$$\delta = 4\alpha^2 \times 0.272 \times \left( f_1 - \frac{1.069}{0.272} + \frac{f_4^2}{m^2 f_3^2} f_2 + \frac{f_4^2}{m^2 f_3^2} f_3 + \frac{1}{m^2} f_4 \right) \quad (3)$$

From this, when aberration is minimum, that is, δ is 0, the following relation can be derived:

[Mathematical 3]

$$f_2 \cong 0.25 \times \left( \frac{m^2 f_1 + f_4}{f_4^2} f_3^2 + f_3 \right) \quad (4)$$

Relations (4) and (1) can yield the following relation:

[Mathematical 4]

$$f_3 \le \frac{3f_4^2}{m^2 f_1 + f_4} \quad (5)$$

Relation (5) is rewritten into:

[Mathematical 5]

$$\frac{f_3}{f_4} \le \frac{3}{m^2 \frac{f_1}{f_4} + 1} \quad (6)$$

Accordingly, if relation (6) is satisfied, aberration can be minimized.

Figure 5:
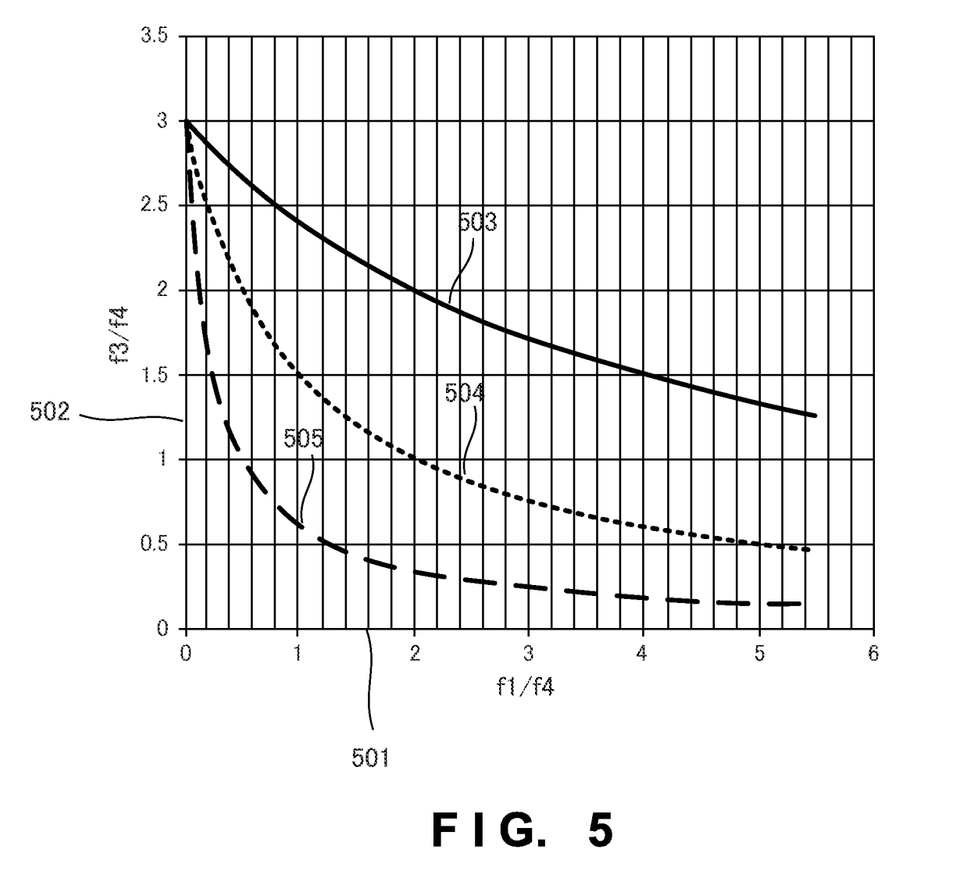
FIG. 5 is a graph showing the relationship between the enlargement magnification and the design parameter allowable range in the optical processing head according to the second embodiment of the present invention.

FIG. 5 shows the relationship of relation (6). An abscissa 501 indicates f1/f4, and an ordinate 502 indicates f3/f4. In FIG. 5, a curve 503 indicates the relationship between f1/f4 and f3/f4 when the enlargement magnification is 0.5. A curve 504 indicates the relationship between f1/f4 and f3/f4 when the enlargement magnification is 1. Further, a curve 505 indicates the relationship between f1/f4 and f3/f4 when the enlargement magnification is 2. According to relation (6), aberration can be minimized if f3/f4 exists on the lower side (negative direction along the ordinate) with respect to the plotted line.

As is apparent from FIG. 5, as the enlargement magnification is smaller, the curve is positioned more upward, and the area on the lower side of the curve becomes larger. That is, the design parameter range is widened. The optical system according to this embodiment therefore has an effect in which the enlargement magnification is small and a high-definition processing apparatus can be easily designed.

The above-described arrangement is applied to lenses each simultaneously having a spherical surface and a flat surface. Such a planoconvex spherical lens or planoconcave spherical lens is lower in cost than an aspherical surface. Since all the lenses have flat surfaces, this produces an effect in which aberration caused by a positional error or aberration caused by the thermal lens effect hardly occurs.

<<Slide Mechanism>>

Figure 6:
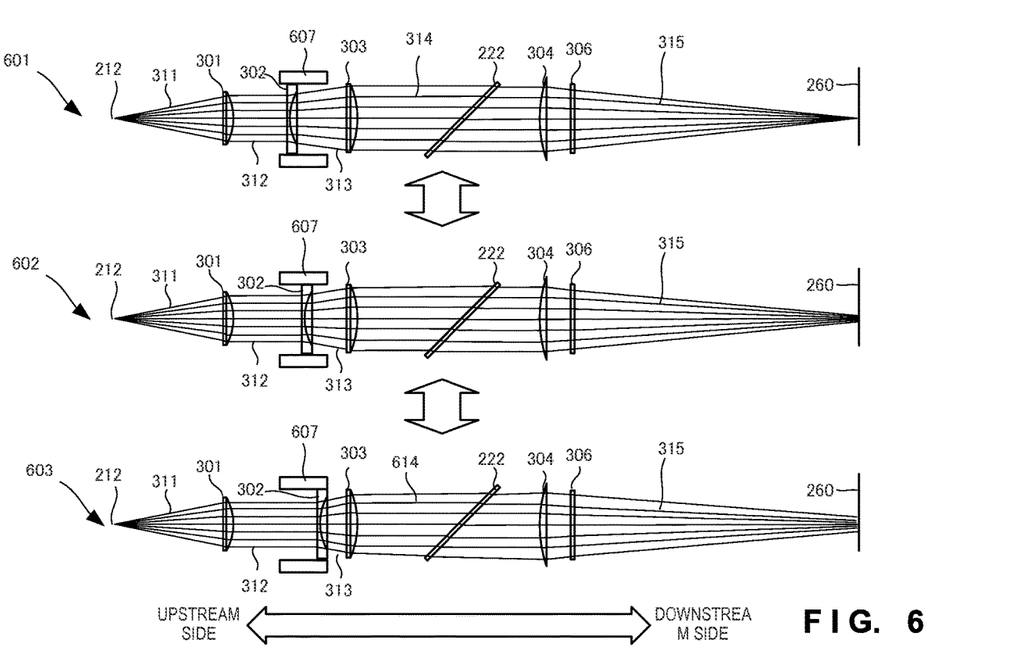
FIG. 6 is a view showing movement control of the concave lens used in the optical processing head according to the second embodiment of the present invention.

As shown in FIG. 6, the planoconcave lens 302 is arranged to be movable along the optical axis. For example, the planoconcave lens 302 can slide along a slide mechanism 607. More specifically, the slide mechanism 607 supports the planoconcave lens 302 so that the planoconcave lens 302 can slide along the optical axis. The slide of the planoconcave lens 302 may be performed manually or using a driving mechanism such as a motor. A control unit (not shown) may automatically control the position of the planoconcave lens 302 in accordance with the defocus value.

When performing high-definition processing, the planoconcave lens 302 is slid to the upstream side to decrease the condensed spot diameter, as represented by 601 in FIG. 6. At this time, as aberration is smaller, the condensed spot becomes smaller and the definition becomes higher.

Thus, the planoconcave lens 302 is moved so that the virtual image focus position (position spaced apart by f2 on the upstream side from the concave lens) of the planoconcave lens 302 coincides with the focus position (position spaced apart by f3 from the second convex lens) when parallel light enters the planoconvex lens 303 from the downstream side.

By gradually sliding the planoconcave lens 302 toward the downstream side, defocusing (increasing the condensed spot diameter on the processing surface 260) can be performed, as represented by 602 and 603 in FIG. 6. If the processing width is optimized by defocusing during processing, the processing accuracy and processing speed can be increased.

When the differential distance of the planoconcave lens 302 (moving distance of the planoconcave lens 302 when the position at the time of focusing is set as the reference) is 10 mm, the condensed spot diameter can be increased by about 15 times of a condensed spot diameter at the time of focusing (for example, when the condensed spot diameter at the time of focusing is 0.2 mm, the condensed spot diameter becomes 3 mm). In 603, the beam that has been the parallel light 314 at the time of focusing becomes divergent light 614. At this time, the diameter of the planoconvex lens 304 is set to be large so that a beam does not fall outside the planoconvex lens 304. At the time of defocusing, F# (f-number) of the convergent light 315 coming out of the planoconvex lens 304 falls within the range of about 4.5 or more.

As described above, satisfactory defocusing can be applied even with the diameter of a compact lens. Although the planoconcave lens 302 is moved here, the present invention is not limited to this and the planoconvex lens 303 may be moved. That is, it is only necessary to change the distance between the planoconcave lens 302 and the planoconvex lens 303 on the optical axis.

Figure 7:
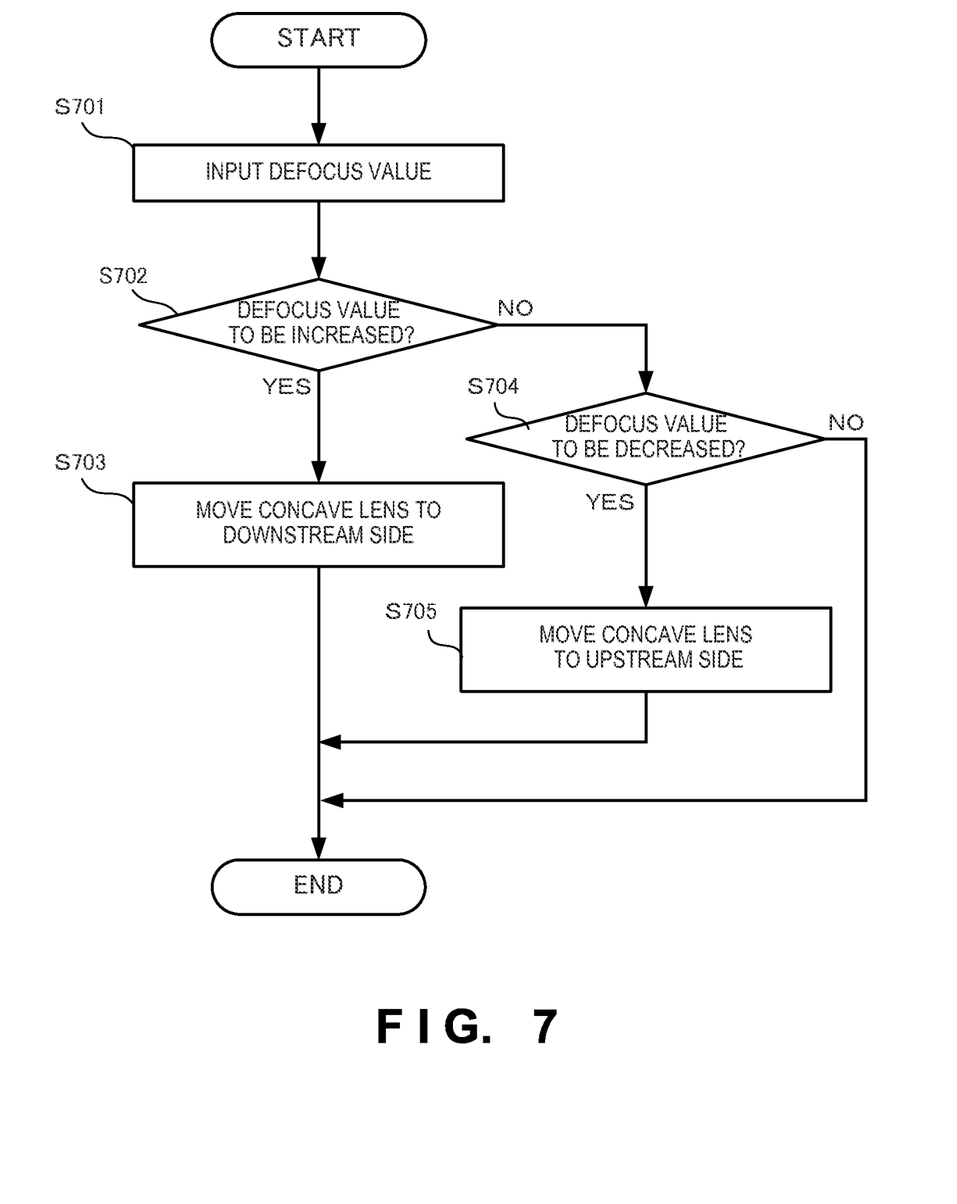
FIG. 7 is a flowchart showing movement control of the concave lens used in the optical processing head according to the second embodiment of the present invention.

FIG. 7 is a flowchart for explaining movement control of the planoconcave lens 302 when performing defocusing. The movement control is performed using a control device (not shown).

First, in step S701, when the condensed spot diameter (to be referred to as a defocus value) is input to the control device, it is determined in step S702 whether the input condensed spot diameter is larger than the current condensed spot diameter, that is, whether to increase the defocus value. If it is determined to increase the defocus value, the planoconcave lens 302 is moved to the downstream side (S703). If it is determined not to increase the defocus value, the process advances to step S704 to determine whether the input defocus value is smaller than the current value, that is, whether to decrease the defocus value. If it is determined to decrease the defocus value, the planoconcave lens 302 is moved to the upstream side (S705). If it is determined not to change the defocus value, the process ends without doing anything.

As described above, the second embodiment can provide an optical processing head with a small energy loss by a simple optical arrangement. The optical, processing heal can also be downsized. Further, defocusing can be implemented very easily.

Third Embodiment

Figure 8:
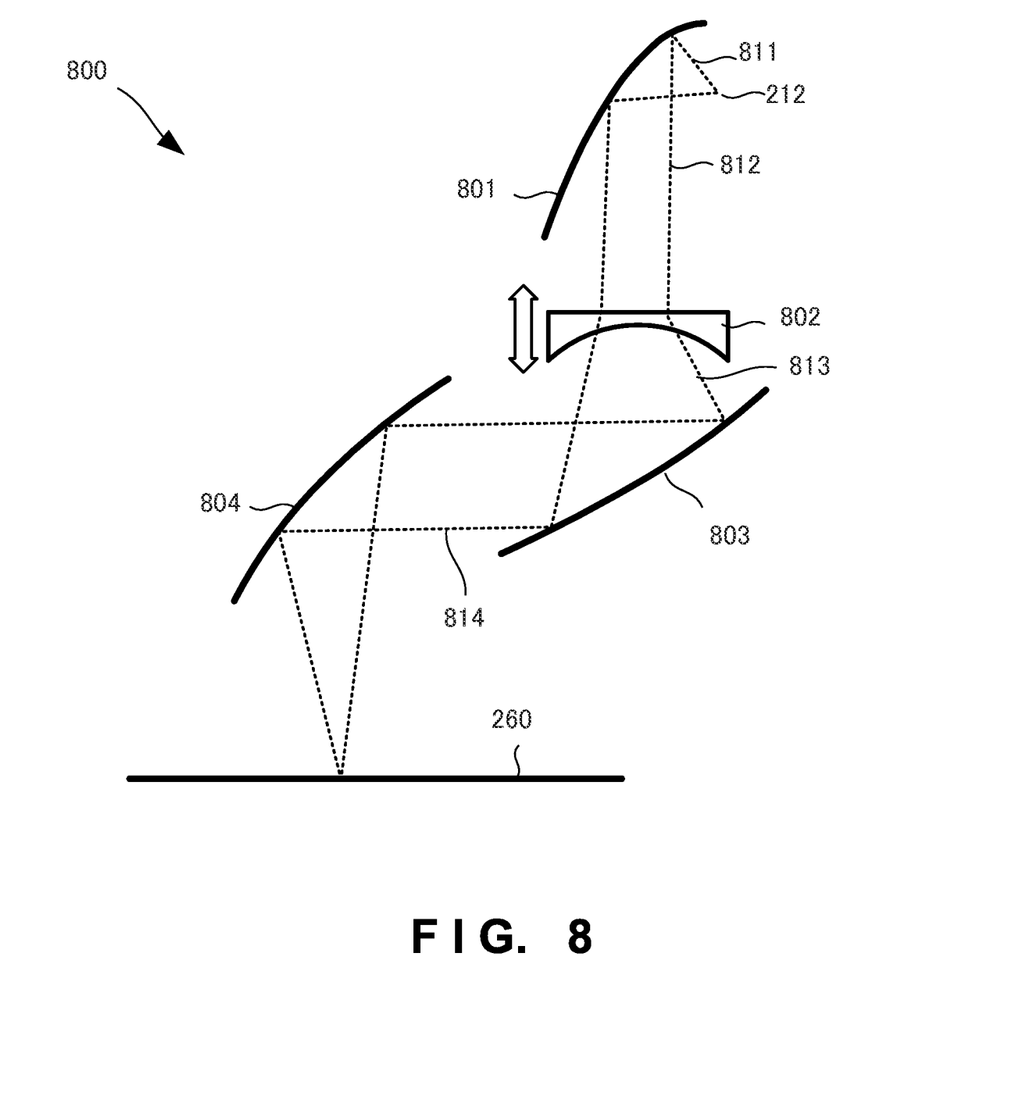
FIG. 8 is a view showing the arrangement of the optical system of an optical processing head according to the third embodiment of the present invention.

An optical processing head 800 according to the third embodiment of the present invention will be described with reference to FIG. 8. FIG. 8 is a view for explaining the optical system of the optical processing head 800 according to this embodiment. The optical processing head 800 according to the third embodiment is different from the second embodiment in which the planoconvex lenses 301, 303, and 304 are replaced by parabolic mirrors 801, 803, and 804, and the overall layout is changed in accordance with the optical path. The remaining arrangement and operation are the same as those in the second embodiment, so the same reference numerals denote the same arrangement and operation and a detailed description thereof will not be repeated.

The parabolic mirror 801 is a parabolic mirror having a focus at an incident end 212, and converts emitted light 811 incoming from the incident end 212 into parallel light 812.

A planoconcave lens 802 is arranged downstream of the parabolic mirror 801, and converts the parallel light 812 into divergent light 813. The planoconcave lens 802 operates to cancel aberration of the overall optical system of the optical processing head 800. That is, the planoconcave lens 802 can decrease aberration of the overall optical system. The planoconcave lens 802 can slide to a position corresponding to the defocus value along the optical axis (direction of an arrow shown in FIG. 8). Although not shown, the optical processing head 800 includes a support portion at which the planoconcave lens 802 is supported slidably.

The parabolic mirror 803 is arranged downstream of the planoconcave lens 802, and converts the divergent light 813 into parallel light 814. The parabolic mirror 803 is a parabolic mirror having a focus at the same position as the virtual image focus position of the planoconcave lens 802 arranged at a predetermined position. That is, the focal length of the parabolic mirror 803 is larger than that of the planoconcave lens 802.

The parabolic mirror 804 is a parabolic mirror having a focus on a processing surface. The parabolic mirror 804 is arranged downstream of the parabolic mirror 803, and converts the parallel light 814 into convergent light that is condensed on the side of a processing surface 260.

Although not shown, a half mirror 222 described above is preferably interposed between the parabolic mirrors 803 and 804. The half mirror 222 is arranged with an inclination of, for example, 45° with respect to the optical axis. While transmitting light emitted by a light source, the half mirror 222 reflects, toward an image capturing device (not shown), light of a visible light component that has been reflected by the processing surface 260 and further reflected by the parabolic mirror 804. As a result, the processing surface 260 can be observed.

As described above, the third embodiment can constitute the optical processing head by using the optical system including the parabolic mirrors 801, 803, and 804 and the planoconcave lens 802. Since all the optical elements (parabolic mirrors) need not be arranged on the optical axis on a straight line, unlike the second embodiment, the degree of freedom of the layout can be increased. Although the third embodiment uses the planoconcave lens 802, a convex mirror having a virtual image focus can also be used instead.

Fourth Embodiment

Figure 9:
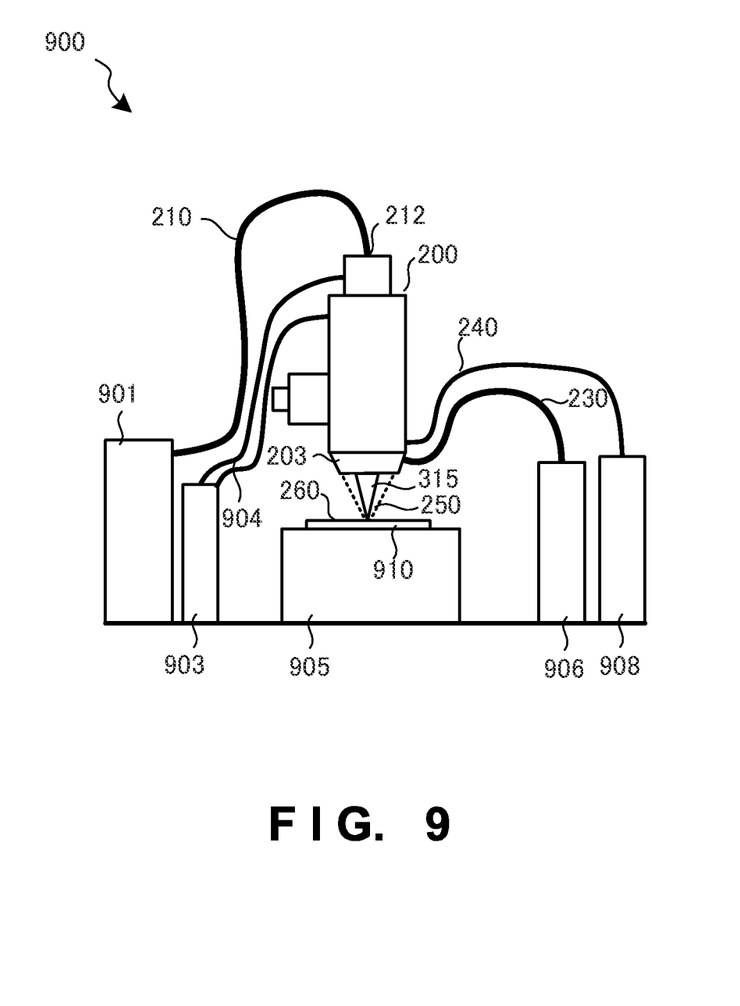
FIG. 9 is a view showing the overall arrangement of an optical machining apparatus according to the fourth embodiment of the present invention.

An optical machining apparatus 900 according to the fourth embodiment of the present invention will be described with reference to FIG. 9. The optical machining apparatus 900 is an apparatus that includes one of the optical processing heads 100, 200, and 800 explained in the above-described embodiments, and generates a three-dimensional shaped object (or overlay welding) by melting a material by heat generated by condensed light. Here, the optical machining apparatus 900 including an optical processing head 200 will be explained as an example.

<<Apparatus Arrangement>>

In addition to the optical processing head 200, the optical machining apparatus 900 includes a light source 901, a light transmitting portion 210, a coolant supply device 903, a coolant supply portion 904, a stage 905, a material supply device 906, a material supply portion 230, a gas supply device 908, and a gas supply portion 240.

The light source 901 can be a laser, an LED, a halogen lamp, a xenon lamp, an incandescent lamp, or the like. The wavelength of a beam is, for example, 1,060 nm, but is not limited to this.

The light transmitting portion 210 is, for example, an optical fiber having a core diameter of ϕ0.01 to 1 mm, and guides light generated by the light source 901 to the optical processing head 200. The core diameter of the light transmitting portion 210 serves as the diameter of an incident end 212.

The coolant supply device 903 stores, for example, water as a coolant, and supplies the coolant by a pump to the coolant supply portion 904.

The coolant supply portion 904 is a resin or metal hose having an inner diameter of ϕ2 to 6. The coolant is supplied into the optical processing head 200, circulated inside it, and returned to the coolant supply device 903, thereby suppressing the temperature rise of the optical processing head 200. The coolant supply amount is, for example, 1 to 10 L/min.

The stage 905 is, for example, an X stage, an X-Y stage, or an X-Y-Z stage, and can operate the respective axes (X, Y, and Z). The material supply device 906 supplies a material to the nozzle 203 via the material supply portion 230. Examples of the material are a metal particle, a resin particle, a metal wire, and a resin wire. The material supply device 906 can simultaneously supply even a carrier gas.

The material supply portion 230 is, for example, a resin or metal hose, and guides, to the nozzle 203, a particulate flow prepared by mixing a material in a carrier gas. However, when the material is a wire, no carrier gas is necessary. The nozzle 203 ejects a material toward a processing surface 260.

The gas supply device 908 supplies a purge gas to the optical processing head 200 through the gas supply portion 240. The purge gas is, for example, nitrogen, argon, or helium. However, the purge gas is not limited to this and may also be another gas as long as the purge gas is an inert gas. The purge gas supplied to the optical processing head 200 is ejected from the nozzle 203 along the above-described beam.

Although not shown, the optical machining apparatus 900 includes an orientation control mechanism and position control mechanism that control the orientation and position of the optical processing head 200.

<<Apparatus Operation>>

Next, the operation of the optical machining apparatus 900 will be explained. A shaped object 910 is created on the stage 905.

Light 315 emitted by the optical processing head 200 is condensed to the processing surface 260 on the shaped object 910. The temperature of the processing surface 260 is raised by the condensed light, and the processing surface 260 is molten. This molted portion is called a molten pool.

The material 250 is ejected from the nozzle 203 to the molten pool of the processing surface 260. The material 250 is molten into the molten pool. After that, the molten pool is cooled and hardened to deposit the material on the processing surface 260, implementing three-dimensional shaping.

The purge gas is ejected, from the nozzle 203 to the processing surface 260. Thus, the peripheral environment of the molten pool is purged by the purge gas. By selecting an oxygen-free inert gas as the purge gas, oxidization of the processing surface 260 can be prevented.

The optical processing head 200 is cooled by the coolant supplied from the coolant supply device 903 through the coolant supply portion 904, suppressing the temperature rise during processing.

By scanning the optical processing head 200 along the processing surface 260 at the same time as the above-described series of operations, desired shaping can be performed while depositing the material. That is, this apparatus can implement overlay welding or three-dimensional shaping.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The present invention is applicable to a system including a plurality of devices or a single apparatus. The present invention is also applicable even when a control program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. Especially, a non-transitory computer readable medium storing a program for causing a computer to execute processing steps included in the above-described embodiments falls within the scope of the present invention.

The invention claimed is:

1. An optical processing head for a laser processing apparatus comprising: a first optical element that is a planoconvex lens having a convex surface on a downstream side and converts light emitted by a light source into first parallel light; a second optical element that is a planoconcave lens having a concave surface on a downstream side and is arranged downstream of said first optical element and converts the first parallel light into first divergent light; a third optical element that is a planoconvex lens having a convex surface on a downstream side and is arranged downstream of said second optical element and converts the first divergent light into second parallel light; and a fourth optical element that is a planoconvex lens having a convex surface on an upstream side, is arranged downstream of said third optical element and converts the second parallel light into convergent light which is condensed toward a processing surface, wherein letting f1 be a focal length of said first optical element, B be a focal length of said third optical element, f4 be a focal length of said fourth optical element, and m be an enlargement magnification of the optical processing head, $$f_3 \leq \frac{3f_4^2}{m^2 f_1 + f_4}$$

is satisfied, and wherein a distance between the first and the second optical elements is smaller than a distance between the third and the fourth optical elements and wherein letting f2 be a focal length of said second optical element, $$f_2 \cong 0.25 \times \left( \frac{m^2 f_1 + f_4}{f_4^2} f_3^2 + f_3 \right).$$

2. The optical processing head according to claim 1, wherein at least one of said second optical element and said third optical element is arranged to be movable along an optical axis.

3. The optical processing head according to claim 1, wherein
said first optical element, said third optical element, and said fourth optical element are planoconvex lenses, and said second optical element is a planoconcave lens.

4. The optical processing head according to claim 3, wherein a focal length of said second optical element is not larger than a focal length of said third optical element.

5. The optical processing head according to claim 3, wherein the second optical element is accommodated in a lens holder.

6. The optical processing head according to claim 5, wherein the lens holder comprises a female holder and a male holder.

7. The optical processing head according to claim 1, wherein said second optical element and said third optical element are arranged to make a virtual image focus of said second optical element that receives the first parallel light, coincide with a focus of said third optical element that receives the first divergent light.

8. An optical machining apparatus comprising:
an optical processing head defined in claim 1;
a light source; and
a light transmitting portion that transmits light emitted by said light source to said optical processing head.

9. A control method of controlling an optical processing head defined in claim 1, comprising:
inputting a defocus value of the light on the processing surface; and
moving at least one of the second optical element and the third optical element along an optical axis in accordance with the defocus value.

10. The optical processing head control method according to claim 9, wherein in the moving, when the input defocus value is larger than a current condensed spot diameter, the second optical element is moved to an upstream side.

11. A control program of controlling an optical processing head defined in claim 1, causing a computer to execute:
inputting a defocus value of the light on the processing surface; and
moving at least one of the second optical element and the third optical element along an optical axis in accordance with the defocus value.

12. The optical processing head according to claim 1, wherein a half mirror is interposed between two adjacent lenses among the first, the second, the third, and the fourth optical elements, and reflects a visible light component without interrupting the light emitted by the light source such that the processing surface can be observed.

13. An optical processing head comprising: a first optical element that is a planoconvex lens having a convex surface ort a downstream side and that converts light emitted by a light source into first parallel light; a second optical element that is a planoconcave lens having a concave surface on a downstream side, arranged downstream of said first optical element and converts the first parallel light into first divergent light, and movable along an optical axis; a third optical element that is a planoconvex lens having a convex surface on a downstream side and is arranged downstream of said second optical element and converts the first divergent light into second parallel light; and a fourth optical element that is a planoconvex lens having a convex surface on an upstream side and is arranged downstream of said third optical element and converts the second parallel light into convergent light which is condensed toward a processing surface characterized in that letting f1 be a focal length of said first optical element, f3 be a focal length of said third optical element, f4 be a focal length of said fourth optical element, and m be an enlargement magnification of the optical processing head, $$f_3 \leq \frac{3f_4^2}{m^2 f_1 + f_4}$$

is satisfied, and
  wherein a distance between the first and the second optical elements is smaller than a distance between the third and the fourth optical elements and
  wherein letting f2 be a focal length of said second optical element, $$f_2 \cong 0.25 \times \left( \frac{m^2 f_1 + f_4}{f_4^2} f_3^2 + f_3 \right).$$

* * * * *